(12) United States Patent
Chen et al.

(10) Patent No.: US 7,336,656 B1
(45) Date of Patent: *Feb. 26, 2008

(54) METHOD FOR HANDLING INCOMING CALLS DIRECTED TO A VIRTUAL COMMUNICATION SERVICE SUBSCRIBER VIA A SHARED LINE SYSTEM

(75) Inventors: Yihsiu Chen, Middletown, NJ (US); Mark Jeffrey Foladare, East Brunswick, NJ (US); Shelley B. Goldman, East Brunswick, NJ (US); Shawn Jean, Morris Plains, NJ (US); Joan Madden, Morristown, NJ (US); Shaoqing Q. Wang, Morganville, NJ (US); Roy Philip Weber, Bridgewater, NJ (US); Robert S. Westrich, Middletown, NJ (US); Aleksandr Zelezniak, Matawan, NJ (US)

(73) Assignee: AT&T Corp., New York, NY (US)

(*) Notice: Subject to any disclaimer, the term of this patent is extended or adjusted under 35 U.S.C. 154(b) by 3 days.

This patent is subject to a terminal disclaimer.

(21) Appl. No.: 11/068,701

(22) Filed: Mar. 1, 2005

Related U.S. Application Data

(63) Continuation of application No. 09/867,284, filed on May 29, 2001, now Pat. No. 6,870,835.

(51) Int. Cl.
*H04L 12/66* (2006.01)

(52) U.S. Cl. .................... 370/356; 370/354; 379/88.24
(58) Field of Classification Search ............... None
See application file for complete search history.

(56) References Cited

U.S. PATENT DOCUMENTS

| | | | | |
|---|---|---|---|---|
| 5,339,354 | A | * | 8/1994 | Becker et al. ............ 379/88.24 |
| 5,694,462 | A | * | 12/1997 | Shearer .................. 379/211.02 |
| 6,195,357 | B1 | * | 2/2001 | Polcyn ....................... 370/401 |
| 6,724,876 | B2 | | 4/2004 | Williams et al. |
| 6,763,102 | B1 | | 7/2004 | Chen et al. |
| 2001/0040887 | A1 | * | 11/2001 | Shtivelman et al. ......... 370/352 |
| 2003/0086556 | A1 | * | 5/2003 | Welch et al. .......... 379/265.09 |
| 2004/0066923 | A1 | * | 4/2004 | Robinson .................... 379/166 |
| 2004/0081307 | A1 | | 4/2004 | Fujiwara et al. |

* cited by examiner

*Primary Examiner*—Duc Ho

(57) ABSTRACT

A method of handling incoming calls directed to a virtual communication subscriber is disclosed. An incoming call intended for the virtual communication subscriber is received at a communication device. A call is placed to the communication device using contact information provided by the virtual communication subscriber. Extension information is provided to a SLS when the call is answered which corresponds to a communication line associated with the communication device. Upon connection to the communication device, the incoming call is bridged with the call placed to the communication device.

20 Claims, 4 Drawing Sheets

50

METHOD FOR HANDLING INCOMING CALLS DIRECTED TO A VIRTUAL COMMUNICATION SERVICE SUBSCRIBER VIA A SHARED LINE SYSTEM

CROSS-REFERENCE TO RELATED APPLICATIONS

This application is a continuation of U.S. patent application Ser. No. 09/867,284, filed May 29, 2001 now U.S. Pat. No. 6,870,835, and is herein incorporated by reference.

TECHNICAL FIELD

The present invention relates to virtual communication systems (VCS), and more particularly, to a system for handling incoming calls directed to a virtual communication subscriber who is connected to a communication network via a shared line system.

BACKGROUND OF THE INVENTION

Virtual communication systems (VCS) have been developed which allow a person to work in non-traditional work environments, such as at home or in a hotel room while still affording the worker the benefit of sophisticated communication services. Systems such as the ones described in co-pending patent application Ser. Nos. 09/318,015 and 09/370,766, which are incorporated by reference, describe systems which allow for a remote worker to utilize sophisticated communication services provided by the network without requiring the worker to have special communication equipment.

VCS is also beneficial to small businesses which cannot afford to own a Public Branch Exchange (PBX) or are not large enough to justify a PBX, but still wish to have sophisticated communication features. Many small businesses use shared line communication systems, such as Key Telephone Systems (KTS). A KTS allows for calls to be placed or received at any one of a number of telephone sets, and over any one of a plurality of available telephone lines from a central office. Typically, a KTS has a single telephone number which is used for incoming calls. A receptionist or Interactive Voice Response (IVR) unit answers the calls and then directs each call to an extension which is associated with a particular party. The lines associated with the KTS are shared by the extensions such that a system may have 20 extensions but only ten lines. The ratio of the number of extensions to number of lines may be determined based on traffic flows through the KTS (e.g., the number of concurrent incoming and outgoing calls).

A requirement of VCS is that a user of VCS be able to identify a telephone number at which the user can send and receive telephone calls. This can cause problems when the user is located at a facility which uses a KTS or other type of shared line system. Because a user of a KTS cannot be reached directly, the user cannot effectively get access to all VCS services.

SUMMARY OF THE INVENTION

The present invention is directed to a method for handling incoming calls directed to a communication subscriber who is connected to a communication network via a shared line system. A subscriber logs onto a VCS platform and provides the VCS platform with his location information which includes a reach telephone number and extension information which is stored in a database server. The VCS platform provides the extension information to an Internet Protocol Public Branch Exchange (IPPBX) associated with the VCS platform. When a caller dials the subscriber's telephone number, the call is transferred to the VCS platform. The VCS platform retrieves the contact information for the subscriber and transfers the information to the IPPBX which places a call to the shared line system. An IP message is also sent from the IPPBX to an IVR providing the IVR with the extension information.

When the call is answered by the shared line system, the IVR provides the extension information to the system. Once the IPPBX has established a connection to the subscriber's line, the IPPBX bridges the incoming call with the connection to the subscriber. While the call is being set up, the VCS platform sends a message to the subscriber's PC indicating that an incoming call has been received. Included may be further information regarding the call. Once the call has been received by the subscriber's telephone, the subscriber can indicate acceptance of the call.

DETAILED DESCRIPTION

Figure 1:
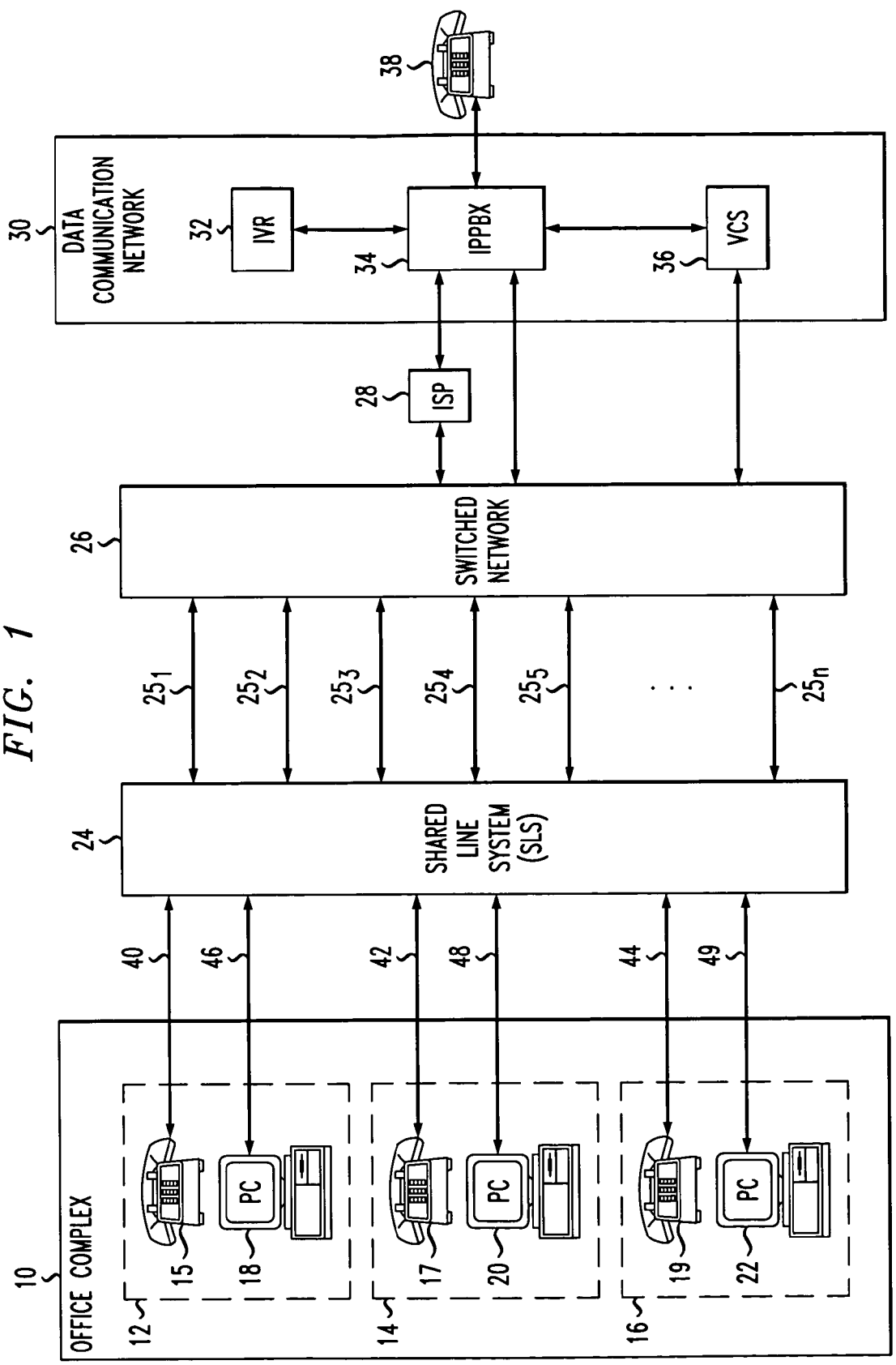
FIG. 1 is a diagram of a network architecture for implementing a Virtual Communication System (VCS) in accordance with the present invention.

Referring to the figures in which like numerals indicate like elements throughout, FIG. 1 illustrates an architecture for a virtual communication system (VCS) which can be used to implement a method of handling incoming calls directed to a virtual communication subscriber who is connected to a communication network via a shared line system in accordance with the present invention. A traditional office environment is shown as including a plurality of stations 12, 14,16 coupled to a Shared Line System (SLS) 24 within an office complex 10. For illustrative purposes, each station 12, 14, 16 includes a telephone 15, 17, 19 and a Personal Computer (PC) 18, 20, 22. The SLS may be a key telephone system such as, for example, the Merlin Magix™ system manufactured by Avaya Inc. The SLS 24 has a fixed number of lines associated with it $25_1$-$25_n$ for receiving and sending calls to and from the stations.

It is to be understood by those skilled in the art that the number of lines associated with the SLS 24 are dependent on the traffic flow at the office complex 10 and may vary from location to location. It is to be also understood by those skilled in the art that while the office complex 10 is shown with three stations 12, 14, 16, the number of stations at the complex and the equipment provided at each station are merely exemplary and that any number of stations may be provided at the office complex 10 without departing from the scope and spirit of the present invention.

In accordance with the present invention, the users of the office stations 12, 14, 16 can have VCS capabilities using a voice network (i.e., switched network 26) and a data communication network 30 to connect the user, via a remote VCS office platform 36 to a network-based Internet Protocol Public Branch Exchange (IPPBX) 34. Alternatively, a conventional Public Branch Exchange (PBX) may be put in the network with the appropriate gateways. As will be described in detail hereinafter, the present invention will focus on those users who are located at a facility which uses a SLS or in which the user does not have enhanced communication functionality (e.g., call forward, hold, conference, etc.).

The data communication network 30 may be a cable network or a data network, such as an Asynchronous Transfer Mode (ATM) network or frame relay network or other type of broadband network such as, but not limited to a Digital Subscriber Line (DSL), ISDN or a combination of these networks. The communication network 30 may also be a packet network which may comprise a single packet network or a multiplicity of packet networks, such as, e.g., the "backbone" networks comprising the Internet or an Intranet. Data sent over a data or packet network can be encrypted, for example, using a 128 bit RSA algorithm. It is to be understood by those skilled in the art that the IPPBX 20 may also be an IP Centrex switch without departing from the scope and spirit of the present invention.

A user may obtain enhanced communication services through a number of alternative connections between the user's station and the IPPBX. Referring specifically to FIG. 1, user work stations 12, 14, 16 are illustrated in which a data connection 40, 42, 44 is established between a user's PC 18, 20, 22 and a data communication network 30 via an Internet Service Provider (ISP) 28, and a voice connection 46, 48, 49 is established between a user's telephone 15, 17, 19 and the switched network 26. The switched network 26 may be the Public Switched Telephone Network (PSTN), wireless network (not shown) or other type of data network (not shown).

It is to be understood that the various components discussed above may or may not comprise physically separate components, but are viewed in these examples as "logically separate" components. As will be discussed in detail hereinafter, a "one-line" arrangement, supporting IP telephony over a data network may be used to deploy the features of the VCS system. It is to be understood by those skilled in the art that any arrangement capable of providing both voice and data communication with the user stations are acceptable.

Figure 2:
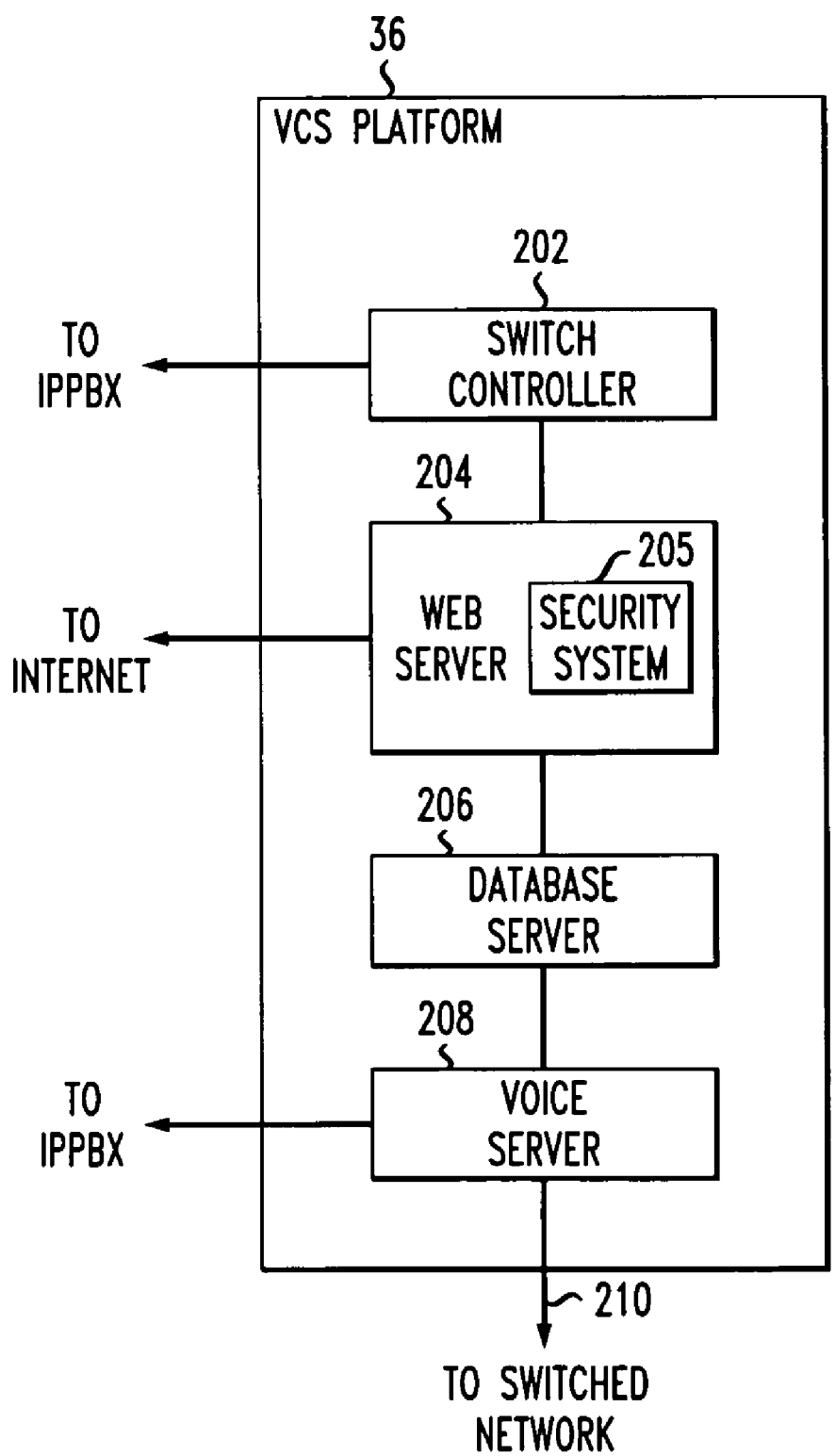
FIG. 2 is an expanded diagram of the elements comprising the VCS platform of FIG. 1.

A remote VCS office platform 36 is in communication with IPPBX 34. In particular, VCS office platform 36 is used to control the communication between IPPBX 34 and user stations 12, 14, 16 so as to provide the enhanced communication features at the user stations. Referring to FIG. 2, the VCS platform 36 includes switch controller 202, web server 204, database 206 and voice server 208. The VCS platform is preferably operated on a workstation, such as but not limited to a Sun Sparcstation. A voice connection 210, such as a T1 line, is shown as coupling voice server 208 to the switched network 26. A data connection couples the web server 204 to the Internet.

The following discussion will provide details associated with call flow to/from a user station. For purposes of discussion, it is assumed that the user is working from station 12. A user must first log in to the VCS system in order to avail himself of any of the call features discussed above. The user initiates a VCS environment by logging in, via his PC 18, over communication network 30 to VCS office platform 36.

Prior to logging in to the VCS office platform 36, the user must first connect to the ISP 28. The ISP 28 can be an Internet service provider such as AT&T Worldnet™. The ISP 28 provides access to the data communication network 30 by providing software to the user's PC 18 which allows the PC 18 to access the data communication network 30 via Points of Presence (POPs) (not shown) which are typically operated and maintained by the ISP 28.

When a user wishes to access the data communication network 30, the user types in a command that causes the PC 18, via a modem (not shown), to dial into the POP. The POP requests a user identification code and password that is verified by the ISP 28. The POP then acts as a gateway to provide the user access to the data communication network 30. Once the PC 18 is connected to ISP 28, the user may enter an Internet Protocol (IP) address or Uniform Resource Locator (URL), which corresponds, to a web site stored within the web server 204 of the VCS platform 36.

In particular, the PC 18 connects to a security system 205 within web server 204. Various security arrangements can be used to authenticate the user and his capability to access the VCS system. Login information is stored in the database server 206 and may include the user's name, a log-in ID and password, the IP address and port number (stored dynamically) associated with the user's PC 18 and the certificate ID of the PC. It is to be understood by those skilled in the art that other means of authentication may be used such as, but not limited to speech verification, retinal scan or fingerprint scan. Thus, only "authorized" individuals will access the VCS platform 36 and the VCS platform 36 will perform the necessary follow-up procedures to grant login permission to the user.

Once the user has been authenticated, web server 204 sends a message to switch controller 202, indicating that the control of all telecommunications with the identified user are to be passed by IPPBX 34 to VCS platform 36. As a result, IPPBX 34 will now hand off all call control to VCS platform 36 for calls associated with the user's station 12 (whether the calls originate from the station 12 or are received by the station 12) and IPPBX 34 will react based upon instruction from VCS platform 36. In particular, the "control message" prompts IPPBX 34 to "forward" all calls to/from the user's office extension directly to VCS platform 36 for call control. Once the user is authenticated, platform 36 transmits to PC 18 via data communication network 30 a "soft phone" interface so as to create a virtual PBX environment using the user's station equipment (i.e., telephone and PC). Various call flows, both into and out of the virtual PBX environment are now possible.

Figure 3:
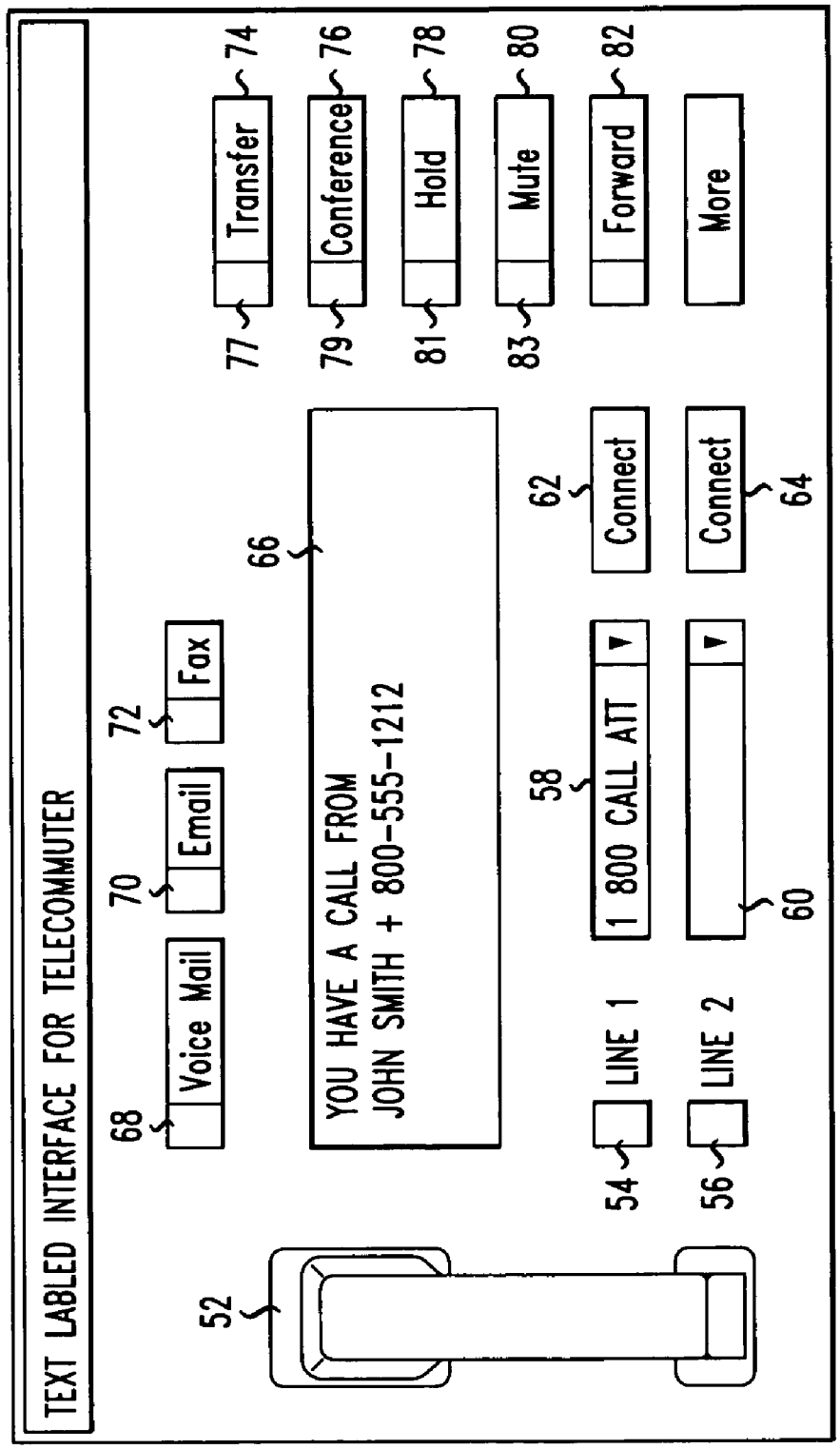
FIG. 3 illustrates a typical soft phone GUI that may be used by a user implementing the VCS system of the present invention.
Figure 4:
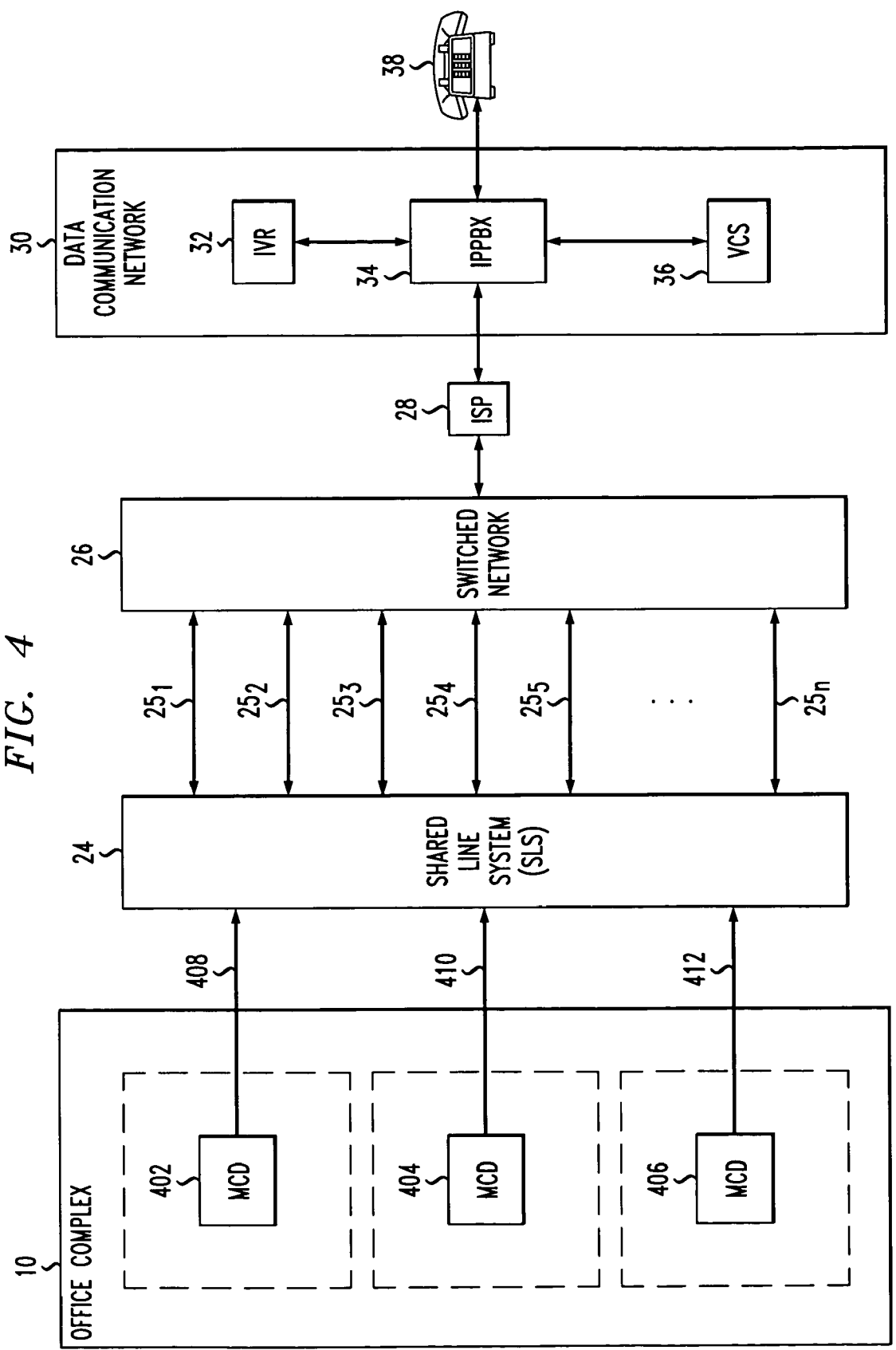
FIG. 4 is a diagram of a network architecture for implementing VCS in accordance with another embodiment of the present invention.

An exemplary soft phone is illustrated in FIG. 3 which exemplifies some of the various PBX station-type functionalities available for the remote worker. The soft phone is preferably a JAVA applet which is generated by web server 204. A graphical handset 52 is included and may be activated to go off-hook by a mouse click—either to answer an incoming call (forwarded from the IPPBX 34) or place an outbound call (to be forwarded to the IPPBX 34 for completion). Display 50 may also include a set of line indicators, in this example, a pair of line indicators 54 and 56 (showing that two separate lines are coming into telephone 15, where the indicators will illustrate the presence of an incoming call (by changing color, for example) or the hold state of one call while another is being answered (by blinking, for example). Associated with each line indicator 54, 56 may be a separate speed dial list, shown by elements 58 and 60. Speed dial list 58, for example may be a pull-down menu of a first set of often-called telephone numbers. Speed dial list 60, which also may be a pull-down menu, may include fax numbers, beeper numbers, or any other telecommunication numbers the user needs. Each speed dial list 58 and 60 has a separate connect button 62 and 64, respectively.

Part of the graphical user interface included within display 50 is a message area 66, which may advantageously provide more information than available at a station directly coupled to a conventional PBX. As shown, in the presence of an incoming call, message area 66 displays a message including caller ID information such as ANI and, perhaps, the name of the calling party. Display 50 may also include message waiting lights (as commonly found on station sets served by a PBX), such as message waiting indicators 68, 70 and 72 associated with voice mail, email, and fax messages. Further as found on PBX-based station sets, display 50 includes a set of buttons with various call treatments. Display 50 includes a transfer button 74, conference button 76, hold button 78, mute button 80 and a forward button 82. A set of display indicators 77, 79, 81 and 83 are associated with these call treatment functions (used to indicate whether or not the various types of call treatment have been activated). For example, if mute button 80 has been activated (such as by a mouse click), indicator light 81 will change in appearance as a reminder that the mute function (i.e., suppressing transmission on the return path) has been activated.

The soft phone allows the user to have additional call flexibility beyond that associated with a traditional PBX (such as the speed dial pull-down menus described above). It is also possible to activate additional sets of call functionality via a call feature button indicated by more button 84. Activation of the more button may bring up for the user an additional set of call functionality (for example, initiating conference calls, accessing corporate messages, broadcasting messages to all station sets, etc.).

In general, VCS office platform 36 is used to emulate the PBX environment on the PC 18 and functions to communicate between IPPBX 34 and PC 18 to control all communication. Using this arrangement, a user is able to take advantage of enhanced communication features such as, hold, transfer and conference from his station 12. In order for the user to make or receive calls, the user must provide the VCS system with a telephone number at which the user can be reached (i.e., reach number). This becomes a problem when the user is working at a location having an SLS 24 as illustrated in FIG. 1.

The SLS 24 has a limited number of lines which are used for both incoming and outgoing calls. More importantly, the SLS 24 typically has one incoming general telephone number having a plurality of extensions. As such, to reach a particular line associated with the SLS 24, a caller must dial a general telephone number, and then have the call directed to the particular line by either a human operator or an Integrated Voice Response (IVR) system.

The present invention allows a user to send and receive incoming calls from his station. As described above, once the user has logged in to the VCS platform 36, a soft phone downloads on the user's PC 18. The user uses the soft phone set up to provide the VCS platform 36 with his location information (in this case, the station information) which includes a reach telephone number (e.g., the office complex main number) and extension information (e.g., station identification). In a preferred embodiment of the present invention, the soft phone would include a menu selection which is labeled either "Office Setup" which the user would access to provide his contact information. The VCS platform 36 stores this information in a database server 206 (FIG. 2). It is to be understood by those skilled in the art that the user can have access to the VCS environment from locations other than his office station. For example, the user can log onto the VCS platform from remote locations as is described in co-pending patent application Ser. Nos. 09/318,015 and 09/370,766, which are incorporated by reference.

In accordance with one embodiment of the present invention, a caller places a call to the user in the usual fashion, dialing the office telephone number associated with the user (for internal calls, abbreviated dialing in terms of a 4 or 5-digit number may be dialed; for external calls the traditional 7 or 10-digit number is dialed). IPPBX 34, upon recognition of the dialed number, will "hand-off" the incoming call to VCS platform 36 via a CTI link (not shown) to switch controller 202. A look-up is performed in database server 206 to determine the reach number for the user (e.g., office number; alternatively the reach number may be dictated by the user and may be a home phone number, an alternative work location number, a cell phone, or a hotel number for a traveling remote worker) and the user's station information. Once the reach number is obtained, web server 204 sends an incoming call message to the user's "soft phone" via data network 30.

The VCS platform 36 communicates the station information to the IVR 32 associated with the IPPBX 34. The VCS platform 36 then places a call to the SLS 24. When the call is answered (either by a human operator or an IVR system (not shown)), the IVR 32 provides the station information to the office answering system (i.e., operator or IVR). The IVR 32 may use text-to-speech generation to provide the room number to the operator. Alternatively, the IVR can specifically request the user by name (e.g., "Please connect me to John Smith's room"). In the case of an IVR system answering the call, the IVR 32 may provide DTMF signals which correspond to the room number (e.g., keypad tones which correspond to the numbers "2", "3", "4" to indicate extension 234). Once the VCS platform 36 has established a connection to the user's station 12, the VCS platform 36 will bridge the incoming call with the user's station 12 and the IVR 32 will be dropped from the call flow path. The IVR 32 may automatically be dropped from the call or the user may affirmatively communicate to the VCS platform 36 that the IVR 32 should be dropped from the call.

As discussed above, while the call is being set up by the VCS platform 36, the VCS platform 36 sends a message to the soft phone on the user's PC 18 indicating that an incoming call has been received. Included may be further information regarding the call (e.g., ANI). Once the call has been received by the user's telephone 15, the user can indicate acceptance of the call by clicking on a continue button (not shown) on the soft phone displayed on the user's PC 18.

When the user wishes to place an outbound call, the user enters the telephone number for the called party on the soft phone located on the user's PC 18 and then clicks on an icon to initiate the call. A call message is transmitted to the VCS platform 36 via the IPPBX 34. The call message includes identification information for the user's station 12 and the number for the outgoing call. The IPPBX 34 places a call to the user's station 12 by dialing the general telephone number for the SLS 24 and providing the answering system with the station information via the IVR 32. Once the IPPBX 34 is connected to the user station 12, the IPPBX 34 places a call to the outgoing number and bridges the call to the user station 12 with the outgoing call.

In an alternative embodiment of the present invention, the user may be using a Multimedia Communication Device (MCD) 402, 404, 406 such as a PC which is capable of handling Internet telephony calls (also referred to as Voice Over IP (VoIP)). The term VoIP has come to reflect a variety of network elements, techniques and technologies, all contributing, in one way or another, to the transmission of a voice call in accordance with the Internet Protocol (IP) over at least a part of its path between one or more voice callers and one or more other voice call participants. Voice packets may be delivered to a VoIP "gateway" where they are delivered through the Internet or other IP network for ultimate delivery to one or more call participants. VoIP gateways and associated network elements are available from many suppliers. For example, eFusion, Inc., Lucent Technologies, Inc., and VocalTec Communications market such VoIP gateways and related products to enable interconnections between the Public Switched Telephone Network and data networks (including the Internet). The Internet Engineering Task Force (IETF), the iNOW industry consortium and other standards bodies are considering various proposals for enabling Internet telephony applications. Other aspects of VoIP are described, e.g., in *Delivering Voice over IP Networks*, by D. Minoli and E. Minoli, John Wiley & Sons, 1998.

The MCD 402, 404, 406 would be connected to the SLS 24 and allow for both data and voice communications over a single one of the shared lines 25$_i$-25$_n$. As in the embodiment described above, prior to logging in to the VCS office platform 36, the user must first connect to the ISP 28. Once the user has logged onto the VCS platform 36, a soft phone downloads on the user's MCD 402. The user uses the soft phone set up to provide the VCS platform 36 with his location information (in this case, the station information), and in particular the IP address for the user's MCD 402. The IP address may be static and permanently assigned to the MCD 402 or may be dynamically assigned by the ISP 28 each time the user logs on to the ISP 28. In a preferred embodiment of the present invention, the soft phone would include a menu selection which is labeled "Office Setup" which the user would access to provide his contact information. The VCS platform 36 stores this information in a database server 206 (FIG. 2). It is to be understood by those skilled in the art that the user can have access to the VCS environment from locations other than his office station. For example, the user can log onto the VCS platform from remote locations as is described in co-pending patent application Ser. Nos. 09/318,015 and 09/370,766, which are incorporated by reference.

In accordance with one embodiment of the present invention, a caller places a call to the user in the usual fashion, dialing the office telephone number associated with the user (for internal calls, abbreviated dialing in terms of a 4 or 5-digit number may be dialed; for external calls the traditional 7 or 10-digit number is dialed). Alternatively, the caller may provide an IP address which corresponds to the general telephone number. IPPBX 34, upon recognition of the dialed number, will hand-off the incoming call to VCS platform 36 via a CTI link (not shown) to switch controller 202. A look-up is performed in database server 206 to determine the IP address for the user. Once the IP address is obtained, web server 204 sends an incoming call message to the user's "soft phone" via data network 30. The VCS platform 36 then places a call to the MCD 402 using the IP address. When the call is answered, the VCS platform 36 will bridge the incoming call with the MCD.

As discussed above, while the call is being set up by the VCS platform 36, the VCS platform 36 sends a message to the soft phone on the MCD 402 indicating that an incoming call has been received. Included may be further information regarding the call (e.g., ANI). Once the call has been received by the MCD 402, the user can indicate acceptance of the call by clicking on a continue button (not shown) on the soft phone displayed on the MCD 402.

When the user wishes to place an outbound call, the user enters the telephone number for the called party on the soft phone located on the user's MCD 402 and then clicks on an icon to initiate the call. A call message is transmitted to the VCS platform 36 via the IPPBX 34. The call message includes identification information for the user's station 12 and the number for the outgoing call. The IPPBX 34 places a call to the user's station 12 by dialing the general telephone number for the SLS 24 and providing the answering system with the station information via the IVR 32. Once the IPPBX 34 is connected to MCD 402, the IPPBX 34 places a call to the outgoing number and bridges the call to the MCD 402 with the outgoing call.

While the present invention has been described in connection with the illustrated embodiments, it will be appreciated and understood that modifications may be made without departing from the true spirit and scope of the invention. For example, while the present invention is described with reference to incoming calls to a user's station, it can be appreciated that the present invention may be used in any situation in which a worker is working at a location which is not associated with a PBX. It is to be understood that the particular embodiments shown and described by way of illustration are in no way intended to be considered limiting. Therefore, references to details of particular embodiments are not intended to limit the scope of the claims, which in themselves recite only those features regarded as essential to the invention.

We claim:

1. A method for handling incoming calls directed to a communication station coupled to a shared line system (SLS), comprising:

receiving an incoming call intended for the communication station;

providing location information of the communication station to the SLS via a network;

establishing a connection with the communication station via the SLS; and bridging the incoming call via said connection to the communication station.

2. The method of claim 1, further comprising:

receiving the location information from the communication station.

3. The method of claim 1, wherein the location information comprises at least one of: a reach telephone number, extension information, and station identification.

4. The method of claim 1, wherein the providing step further comprises instructing an Interactive Voice Response (IVR) system to provide the location information to the SLS.

5. The method of claim 4, wherein the IVR generates at least one of: speech corresponding to the location information and Dual Tone Multifrequency (DMTF) tones corresponding to the location information.

6. The method of claim 4, wherein the location information comprises at least one of: the name of the virtual communication subscriber and an extension line associated with a main number of the SLS.

7. The method of claim 1, further comprising:

transmitting an incoming call message to the communication station via the SLS using the location information.

8. The method of claim 7, wherein the incoming call message comprises the calling party's telephone number.

9. The method of claim 1, wherein the communication station comprises a multimedia communication device.

10. The method of claim 7, further comprising:
receiving an instruction from the communication station in response to the incoming call message regarding disposition of the incoming call.

11. A system for handling incoming calls directed to a communication station coupled to a shared line system (SLS), comprising:
means for receiving an incoming call intended for the communication station;
means for providing location information of the communication station to a the SLS via a network;
means for establishing a connection with the communication station via the SLS; and
means for bridging the incoming call via the connection to the communication station.

12. The system of claim 11, further comprising:
means for receiving the location information from the communication station.

13. The system of claim 11, wherein the location information comprises at least one of: a reach telephone number, extension information, and station identification.

14. The system of claim 11, wherein the means for providing further comprises a means for instructing an Interactive Voice Response (IVR) system to provide the location information to the SLS.

15. The system of claim 14, wherein the IVR system generates at least one of: speech corresponding to the location information and Dual Tone Multifrequency (DMTF) tones corresponding to the location information.

16. The system of claim 14, wherein the location information comprises at least one of: the name of the virtual communication subscriber and an extension line associated with a main number of the SLS.

17. The system of claim 11, further comprising:
means for transmitting an incoming call message to the communication station via the SLS using the location information.

18. The system of claim 17, wherein the incoming call message comprises the calling party's telephone number.

19. The system of claim 11, wherein the communication station comprises a multimedia communication device.

20. The system of claim 17, further comprising:
means for receiving an instruction from the communication station in response to the incoming call message regarding disposition of the incoming call.

* * * * *